H. G. CHALKLEY & DE WITT C. CONKLING.
SCALE READING DEVICE.
APPLICATION FILED MAY 28, 1915.

1,180,283.

Patented Apr. 25, 1916.
3 SHEETS—SHEET 1.

WITNESSES:
L. Hauerstein
J. C. Larsen

INVENTORS
Henry G. Chalkley
De Witt C. Conkling
BY Munn & Co
ATTORNEYS

H. G. CHALKLEY & DE WITT C. CONKLING.
SCALE READING DEVICE.
APPLICATION FILED MAY 28, 1915.
1,180,283.
Patented Apr. 25, 1916.
3 SHEETS—SHEET 2.
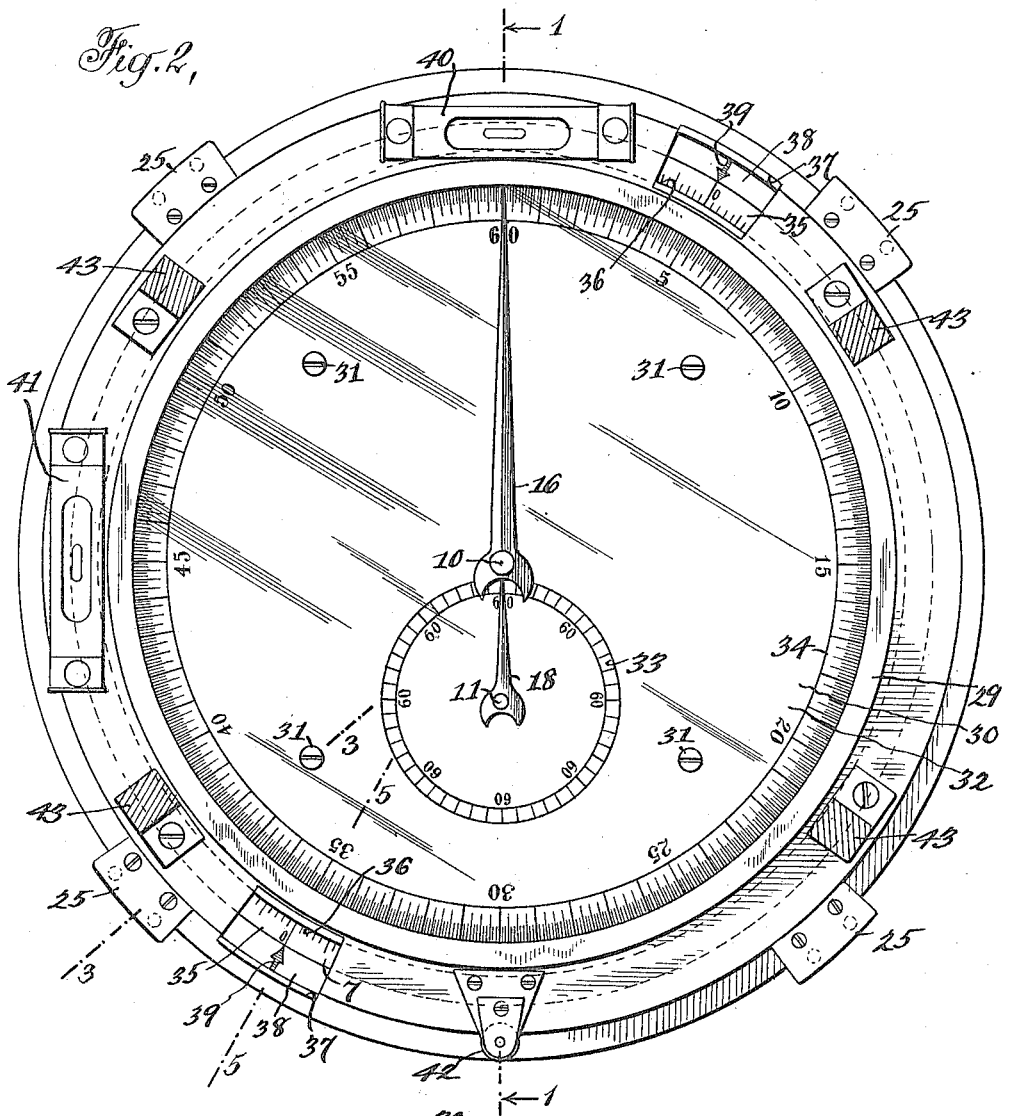
Fig. 2.
Fig. 3.
WITNESSES:
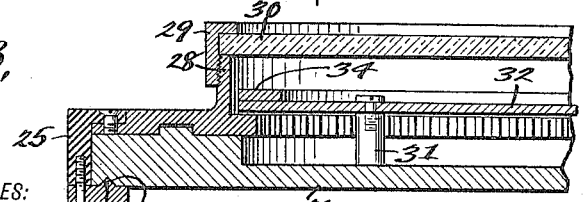
INVENTORS
Henry G. Chalkley
DeWitt C. Conkling
BY
ATTORNEYS H. G. CHALKLEY & DE WITT C. CONKLING.
SCALE READING DEVICE.
APPLICATION FILED MAY 28, 1915.

1,180,283.

Patented Apr. 25, 1916.

3 SHEETS—SHEET 3.

WITNESSES:

INVENTORS
Henry G. Chalkley
DeWitt C. Conkling
BY
ATTORNEYS

UNITED STATES PATENT OFFICE.

HENRY GEORGE CHALKLEY AND DE WITT CLINTON CONKLING, OF SAN PEDRO SULA, HONDURAS.

SCALE-READING DEVICE.

1,180,283.   Specification of Letters Patent.   Patented Apr. 25, 1916.

Application filed May 28, 1915.   Serial No. 30,947.

*To all whom it may concern:*

Be it known that we, HENRY G. CHALKLEY and DE WITT C. CONKLING, citizens of the United States, residing at San Pedro Sula, Department of Cortes, Republic of Honduras, Central America, have invented certain new and useful Improvements in Scale-Reading Devices, of which the following is a specification.

Our invention relates to instruments of precision, and the object thereof is to provide a simple and accurate means whereby the scale, vertical or horizontal, of any surveying instrument, transit, theodolite, or level, may be read at sight to fractions of a second, if necessary, without a vernier or the use of a microscope, which is an absolute necessity on all present style instruments reading as close as 30 seconds now known to us, our means also being applicable to protractors, and all scientific and mathematical instruments where the degrees, minutes and seconds of the circle have to be read.

Our invention is fully described in the following specification, of which the accompanying drawings form a part, in which like characters refer to like parts in each of the views, and in which:—

Figure 1:
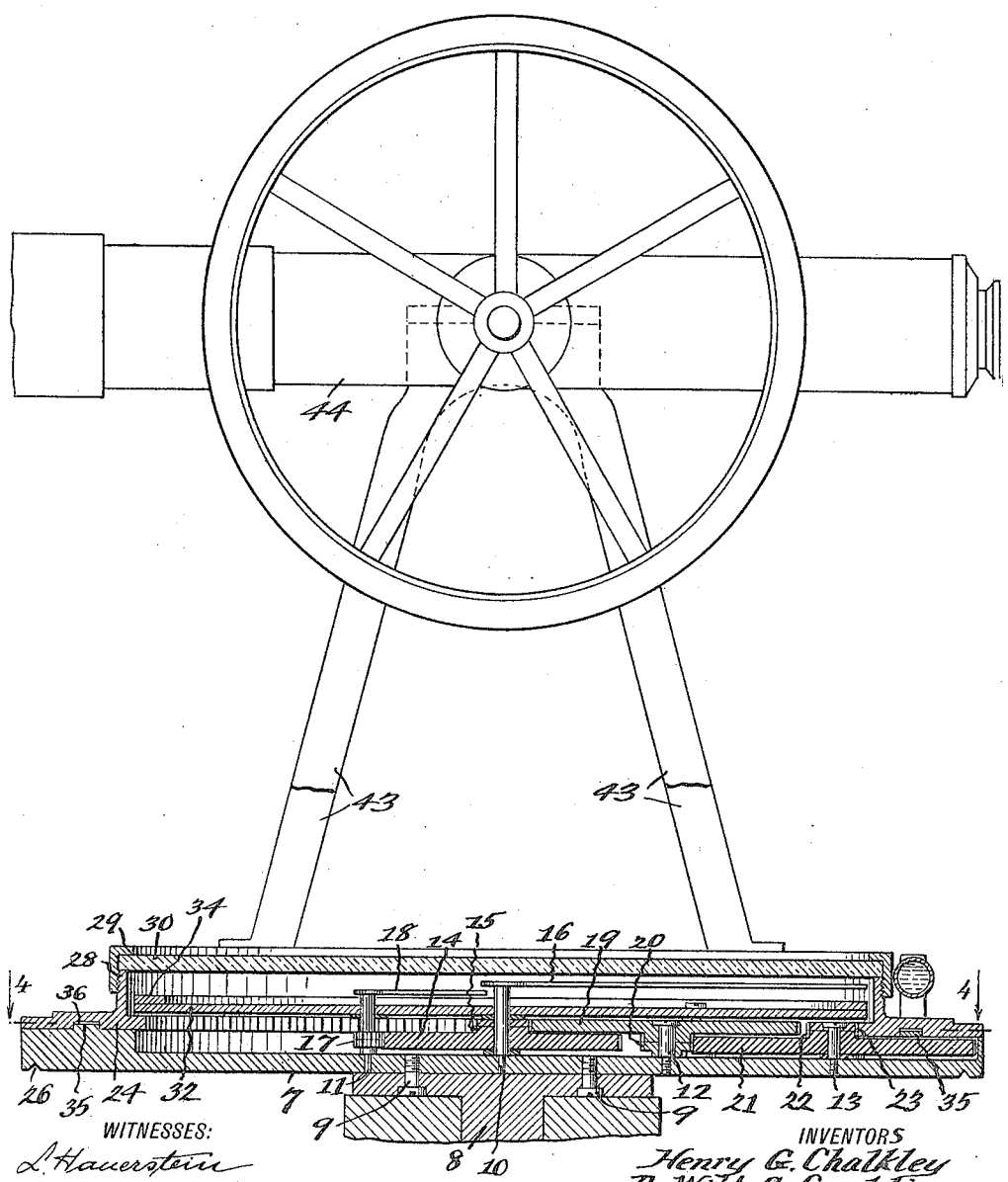
Figure 4:
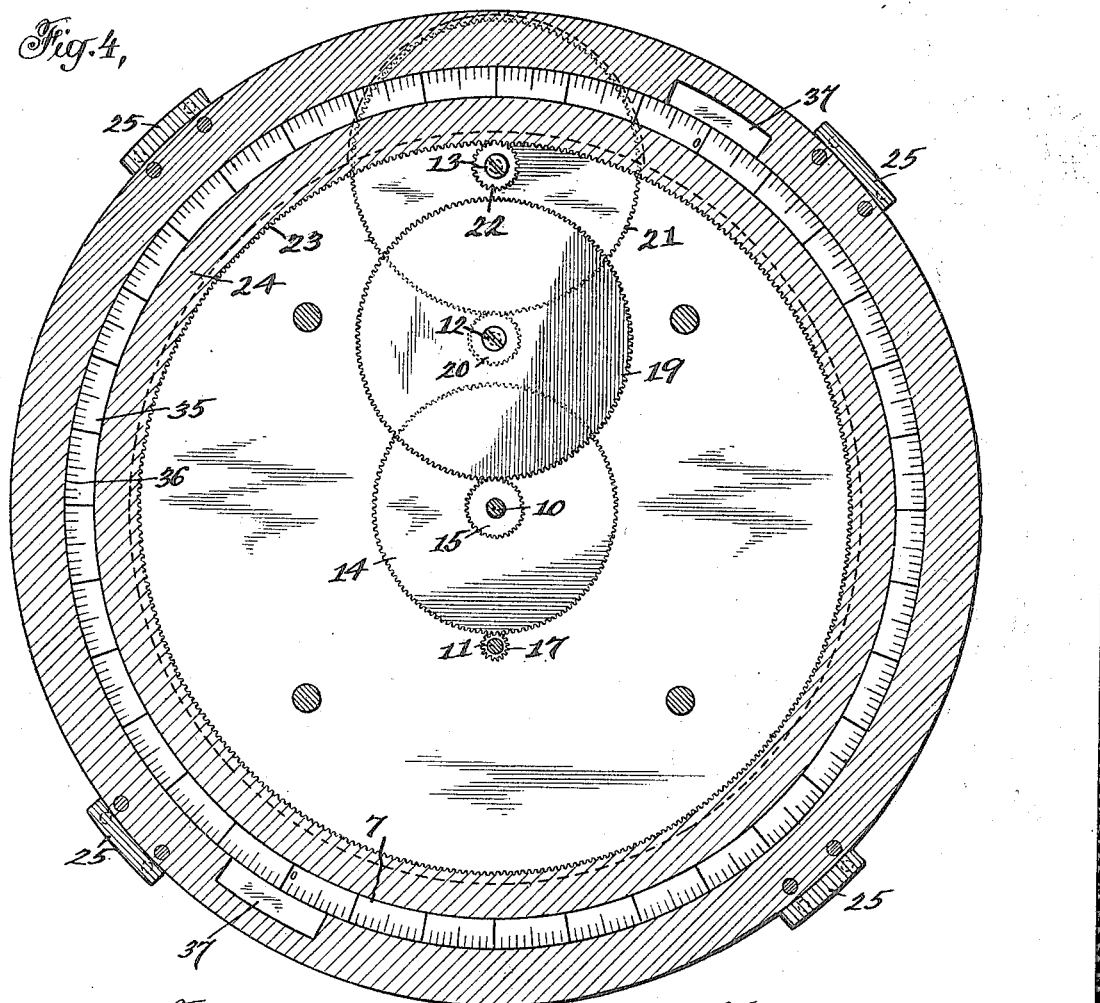
Figure 5:
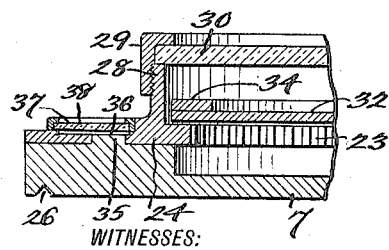
Figure 6:
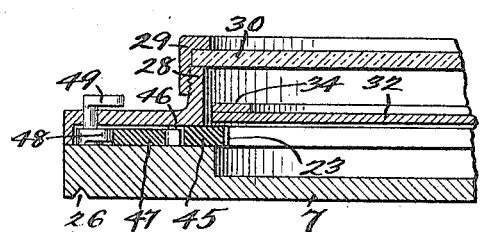

Figure 1 is a side view of a surveying instrument provided with our invention in central, vertical, section on the line 1—1 of Fig. 2; Fig. 2 is a plan view of our invention; Fig. 3 is a partial section on the line 3—3 of Fig. 2; Fig. 4 is a section on the line 4—4 of Fig. 1; Fig. 5 is a partial section on the line 5—5 of Fig. 2; and Fig. 6 is a similar section but showing a modification thereover and a lock which we may employ.

In the form illustrated in Figs. 1 to 5, inclusive, we have shown a base plate 7 of circular form secured to a suitable support 8, such as the head of a tripod, by means of screws 9, and having four pins or screws 10, 11, 12, and 13 mounted therein along a diametral line; the first of these, 10, is at the center of the circle on which the base plate is formed and carries a rotatable sleeve to which a gear wheel 14 and pinion 15 are secured and also an indicating hand 16 at the upper end thereof; the pin 11 carries a sleeve to which a pinion 17 is secured and also an indicating hand 18 at the upper end thereof, said pinion 17 being enmeshed with the gear 14; the screw 12 supports a revoluble gear 19 enmeshed with the pinion 15 and a pinion 20 enmeshed with a gear 21 revoluble on the screw 13, a pinion 22 being fixed to said gear 21; the pinion 22 is enmeshed with a large internal gear 23 on a revoluble ring 24 carried by the base plate and held thereto by clamps 25 of any desired form, though we prefer to provide a circular groove 26 in the under side of the base plate 7 for guiding projections 27 on the clamps, Fig. 3, whereby the relationship between the base plate and ring 24 is constant. The ring 24 carries a vertical flange 28 threaded at its upper end to receive a rim 29 which holds a glass cover 30 in place, over the indicating hands 16 and 18. Carried by posts 31 on the upper surface of the base plate is a plate 32 through which the sleeves of the said indicating hands pass, said plate having a circular scale arranged around the sleeve of the hand 18, shown at 33, Fig. 2, and a circular scale 34 arranged on its outer edge having the sleeve of the hand 16 as its center.

The base plate 7 has a boss 35 thereon which carries a scale 36, Figs. 2 and 4, and the ring 24 is provided with windows 37 covered by transparent plates 38 through which the scale 36 may be viewed, each of said plates 38 having an indicating arrow 39 in stationary position thereon. The ring 24 is circularly grooved to receive the boss 35, as shown in Figs. 1, 3, and 5, still further insuring the relationship between the said ring and the base plate, and said ring may carry levels 40 and 41, a tangent screw 42, and the standards 43 for the instrument 44, this being a telescope in the present showing. The boss 35 is graduated to 360 degrees, and the internal gear 23 has 360 teeth; the pinion 22 has 24 teeth, thus making 15 revolutions to one of the ring 24; the gear 21 connected with the pinion 22 has 144 teeth and the pinion 20 enmeshed therewith has 27 teeth; the gear 19 connected with the pinion 20 has 135 teeth and is enmeshed with the pinion 15 which has 30 teeth, the ratio between the internal gear 23 and the pinion 15 being 1–360; the gear 14 has 120 teeth and the pinion enmeshed therewith, 17, has 15 teeth, the ratio between the hands 16 and 18 being 1–8.

The scale or dial 33 is provided where it is desired to read down to seconds or even to split seconds if required, this being accomplished either by the train of gears shown, by a worm gear, by a combination of a tangent screw and micrometer with a graduated head, etc., but we do not limit ourselves to either its inclusion or its omission.

It will be seen that movement of the telescope 44 to revolve the carrying ring 24 therefor for a distance of one degree on the scale 36 will revolve the hand 16 through a complete circle of 360 degrees, or a movement of the ring 24 of less than one degree, or minute, will revolve the hand 16 through an arc of a circle of corresponding length, showing the fractional part of the minute, or the number of seconds; and this movement of the hand 16, if beyond one second on the dial or scale 36, may be read to the fractional part of a second on the dial or scale 33.

The foregoing description applies to a ring 24 having the teeth of the internal gear 23 integral therewith, with no possibility of adjustment between the zero arrow 39 and said internal gear, but we may, if desired, form the internal gear on an independent ring 45, Fig. 6, which is also provided with V-shaped teeth 46 on its outer periphery adapted to be adjustably engaged by a toothed slide 47 arranged between the base plate and the ring 24 and operable by means of a cam 48 having a finger piece 49 conveniently located. By means of this arrangement the relationship between the rings 24 and 45 may be altered at will, this being advantageous for some instruments and some uses.

Our device is very compact and may be attached to conventional instruments with little or no change therein, with the consequent ease of reading slight variations from zero. The ring 24 is first revolved until the zero arrow thereon is opposite the desired degree on the scale 36 and, if the lock slide 47 be employed for separate rings 24 and 45, said rings may now be locked together; the tangent screw 42 may now be operated until the minute hand 16 points to 60 on the scale 34, and then turning the ring 24 with the telescope thereon until the minute hand points to the required angle, which can be read with the naked eye to five seconds without a vernier.

We reserve the right to make such structural changes over the forms shown and described as are necessary to adapt our invention to its different possible uses, which are within the spirit of the invention and the scope of the following claims, and which do not sacrifice the advantages described.

Having fully described our invention, what we claim as new, and desire to secure by Letters Patent, is:—

1. A device of the class described, comprising a base plate, a train of gears carried thereby, an indicator hand carried by one of said gears, a ring revoluble on said base plate, and an internal gear on said ring engaged with one of said gears, said base plate carrying a scale graduated to degrees and said ring and arrow to be jointly read, and said base plate carrying a scale for said hand graduated to minutes.

2. A device of the class described, comprising a base plate, a train of gears thereon, an indicator hand carried by one of said gears, a ring revoluble on said base plate, and an internal gear on said ring enmeshed with another of said gears, said base plate carrying a graduated scale for said hand, and means including a supplemental scale for determining a desired initial relationship between said base plate and ring.

3. A device of the class described, comprising a base plate, a train of gears carried thereby, an indicator hand carried by one of said gears, a ring revoluble on said base plate, an internal gear on said ring enmeshed with another of said gears, said base plate carrying a graduated scale for said hand, means including a supplemental graduated scale for determining a desired initial relationship between said base plate and ring, and a tangent screw for adjusting said hand in such base plate and ring relationship.

4. A device of the class described, comprising a base plate provided with a boss having a graduated scale thereon, a train of gears carried by said base plate, an indicator hand carried by one of said gears, a plate carried by said base plate and having a graduated scale thereon for said hand, a ring revoluble on said base plate having a zero arrow thereon adjacent the scale on said base plate and read therewith, and an internal gear on said ring enmeshed with one of said gears, the adjustment of said ring on said base plate being shown in degrees on said first named scale and in minutes and fractions thereof on said indicator hand scale.

5. A device of the class described, comprising a base plate provided with a boss thereon, a ring revoluble thereon provided with a circular groove to receive said boss, means for locking said base plate and ring against separation, an internal gear carried by said ring, a train of gears in operative connection with said internal gear carried by said base plate, and an indicator hand carried by one of said gears, said base plate carrying a graduated scale for determining any adjusted relationship between said base plate and ring.

6. A device of the class described, comprising a base plate provided with a boss thereon, a ring revoluble thereon, having a circular groove to receive said boss, means for locking said base plate and ring against separation, an internal gear carried by said ring, means for adjusting the relationship between said ring and internal gear, a train of gears carried by said base plate in operative connection with said internal gear, and an indicator hand carried by one of said gears, said base having a graduated scale thereon for determining the degree of any adjusted relationship between said base plate and ring.

In testimony whereof we have signed our names to this specification in the presence of two subscribing witnesses.

HENRY GEORGE CHALKLEY.
DE WITT CLINTON CONKLING.

Witnesses:
 MIGUEL CANO,
 LOLELA VEGAS.

Copies of this patent may be obtained for five cents each, by addressing the "Commissioner of Patents, Washington, D. C."